US009423603B2

(12) United States Patent
Hong et al.

(10) Patent No.: US 9,423,603 B2
(45) Date of Patent: Aug. 23, 2016

(54) STEREO MICROSCOPE

(71) Applicants: KOH YOUNG TECHNOLOGY INC., Seoul (KR); KYUNGPOOK NATIONAL UNIVERSITY INDUSTRY—ACADEMIC COOPERATION FOUNDATION, Daegu (KR)

(72) Inventors: Jong-Kyu Hong, Gwangju-si (KR); Hyun-Ki Lee, Daegu (KR); Min-Young Kim, Daegu (KR); Jae-Heon Chung, Gwangmyeong-si (KR)

(73) Assignees: KOH YOUNG TECHNOLOGY INC., Seoul (KR); KYUNGPOOK NATIONAL UNIVERSITY INDUSTRY-ACADEMIC COOPERATION FOUNDATION, Daegu (KR)

(*) Notice: Subject to any disclaimer, the term of this patent is extended or adjusted under 35 U.S.C. 154(b) by 0 days.

(21) Appl. No.: 14/239,007

(22) PCT Filed: Apr. 19, 2013

(86) PCT No.: PCT/KR2013/003352
§ 371 (c)(1),
(2) Date: Feb. 14, 2014

(87) PCT Pub. No.: WO2013/162219
PCT Pub. Date: Oct. 31, 2013

(65) Prior Publication Data
US 2015/0043065 A1    Feb. 12, 2015

(30) Foreign Application Priority Data
Apr. 27, 2012  (KR) .................. 10-2012-0044784

(51) Int. Cl.
*G02B 21/22* (2006.01)
*G02B 21/02* (2006.01)
*G02B 5/04* (2006.01)

(52) U.S. Cl.
CPC ............. *G02B 21/22* (2013.01); *G02B 21/025* (2013.01); *G02B 5/04* (2013.01)

(58) Field of Classification Search
CPC ...... G02B 21/20; G02B 21/22; G02B 21/32; G02B 21/025; G02B 21/241; G02B 21/242; G02B 21/248; G02B 5/04; G02B 5/1814

USPC ....... 359/362, 363, 368, 369, 372, 373, 374, 359/375, 376, 377, 379, 380, 385, 388, 432, 359/462, 831, 833, 834, 835, 836; 351/205
See application file for complete search history.

(56) References Cited

U.S. PATENT DOCUMENTS 3,877,779 A *  4/1975  Pierse .................... G02B 21/20
                                                    359/374
6,598,972 B2 *  7/2003  Strahle ................... G02B 5/04
                                                    351/216

FOREIGN PATENT DOCUMENTS

| KR | 10-1999-0059968 | 7/1999 |
| KR | 10-2004-0032353 | 4/2004 |
| KR | 10-0471598 | 3/2005 |
| KR | 10-2006-0009178 | 1/2006 |
| KR | 10-2007-0101531 | 10/2007 |
| KR | 10-1056484 | 8/2011 |
| KR | 10-2011-0125853 | 11/2011 |

OTHER PUBLICATIONS

Written Opinion of the International Searching Authority for International Application No. PCT/KR2013/003352, dated Aug. 23, 2013.
International Search Report for International Application No. PCT/KR2013/003352, dated Aug. 23, 2013.

* cited by examiner

*Primary Examiner* — Ricky Mack
*Assistant Examiner* — Mustak Choudhury
(74) *Attorney, Agent, or Firm* — Kile Park Reed & Houtteman PLLC

(57) ABSTRACT

A stereo microscope capable of not only adjusting the three dimensional effect of stereoscopic image but also focusing exactly even when the three dimensional effect of stereoscopic image is adjusted, is provided. A spacing distance of a pair of zoom unit can be adjusted so that a user can adjust three dimensional effect of image seen through an ocular lens according to personal tendency to improve convenience. Additionally, an object with a depth such as a hole can be exactly observed without interference of a boundary. Further, even though the three dimensional effect of an image is adjusted by adjusting the spacing distance of the pair of zoom units, the focus of optical system can be exactly adjusted.

7 Claims, 2 Drawing Sheets

STEREO MICROSCOPE

TECHNICAL FIELD

The present invention relates to a stereo microscope, and more particularly to a stereo microscope capable of observing an object through stereoscopic image.

BACKGROUND ART

In general, a microscope includes two lens groups in series, that is, an objective lens group and an ocular lens group for observing a minute structure that cannot be observed through a naked eye.

A stereo microscope including two ocular lens parts for observing an object through stereoscopic image for two eyes has been developed and come into wide use. In stereo microscope, there are two types of Abbe type in which optical axis of objective lens group is parallel to observe an object, and Greenough type in which optical axis of objective lens group forms an specific mechanical angle to object an object.

However, a conventional stereo microscope has a disadvantage of not adjusting three dimensional effect of stereoscopic image according to a user.

DETAILED DESCRIPTION OF THE INVENTION

Objects of the Invention

Therefore, the objects of the invention is to provide a stereo microscope capable of not only adjusting the three dimensional effect of stereoscopic image but also focusing exactly even when the three dimensional effect of stereoscopic image is adjusted.

Technical Solution

A stereo microscope according to an embodiment of the present invention, includes, a pair of zoom units disposed on a focusing lens, the pair of zoom units configured such that a spacing distance between the pair of zoom units are adjusted to adjust a three dimensional effect; a pair of first prisms disposed on each of the zoom units, respectively, configured such that the pair of first prisms move in accordance with the pair of zoom units; a pair of second prisms receiving a beam from the first prism to change a direction of the beam; and a third prism receiving the beam from the second prisms to change a direction of the beam, a spacing distance between the third prism and the second prism being adjusted by amount of changed beam path length between the first prism and the second prism when the each of the first prism moves in accordance with the each of zoom units to compensate the changed beam path length between the first prism and the second prism to maintain the beam path.

Advantageous Effects

According to the stereo microscope of an embodiment of the present invention, a spacing distance of a pair of zoom unit can be adjusted so that a user can adjust three dimensional effect of image seen through an ocular lens. That is, a user can adjust three dimensional effect of image according to personal tendency to improve convenience. Additionally, an object with a depth such as a hole can be exactly observed without interference of a boundary.

Further, even though the three dimensional effect of an image is adjusted by adjusting the spacing distance of the pair of zoom units, the focus of optical system can be exactly adjusted.

EMBODIMENTS OF THE INVENTION

This invention may be embodied in many different forms, and will be described with reference to the accompanying drawings. But this invention should not be construed as limited to the embodiments set forth herein, but should be understood to include every modifications, equivalents and substitutes The terms such as 'first', 'second', etc. may be used for various elements but the elements should not limited by the terms. The terms may be used only for discriminating one element from others. For example, a first element may be named as a second element, and the second element may be named as the first element within the present invention.

The terms used in the present application are only to explain the specific embodiment and is not intended to limit the present invention. The terms "a", "an" and "the" mean "one or more" unless expressly specified otherwise. The terms "including", "comprising", etc., are to designate features, numbers, processes, structural elements, parts, and combined component of the application, and should be understood that it does not exclude one or more different features, numbers, processes, structural elements, parts, combined component.

The technical term or the scientific term that will be used in the specification has the same meaning as a person skilled in the art commonly understood unless defined differently.

The terms defined in a commonly used dictionary should be understood as the context, and should not be understood ideally or excessively unless defined differently.

Hereinafter, preferred embodiments of the present invention will be explained referring to figures.

Figure 1:
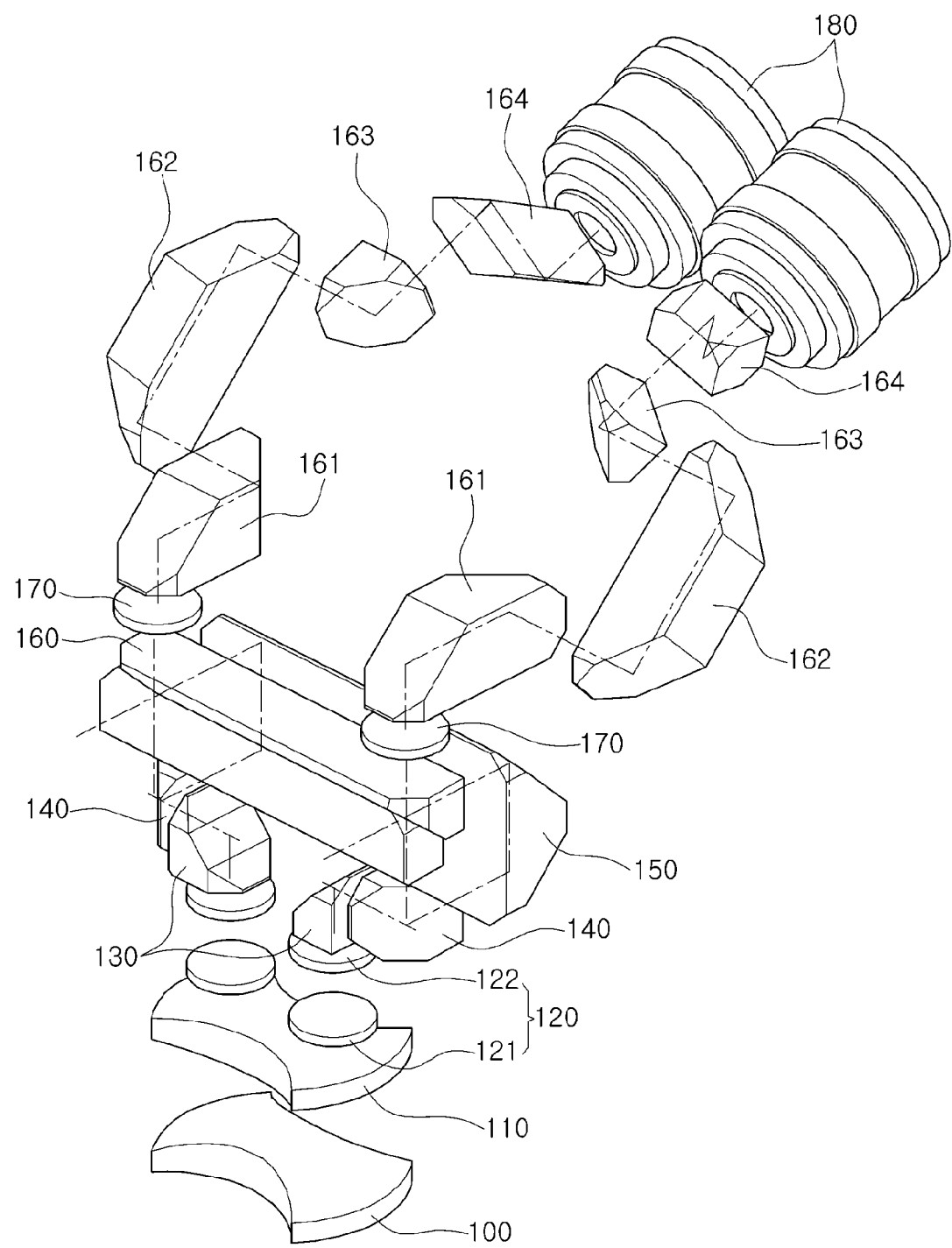
FIG. 1 is a schematic view for illustrating a stereo microscope according to an exemplary embodiment of the present invention.
Figure 2:
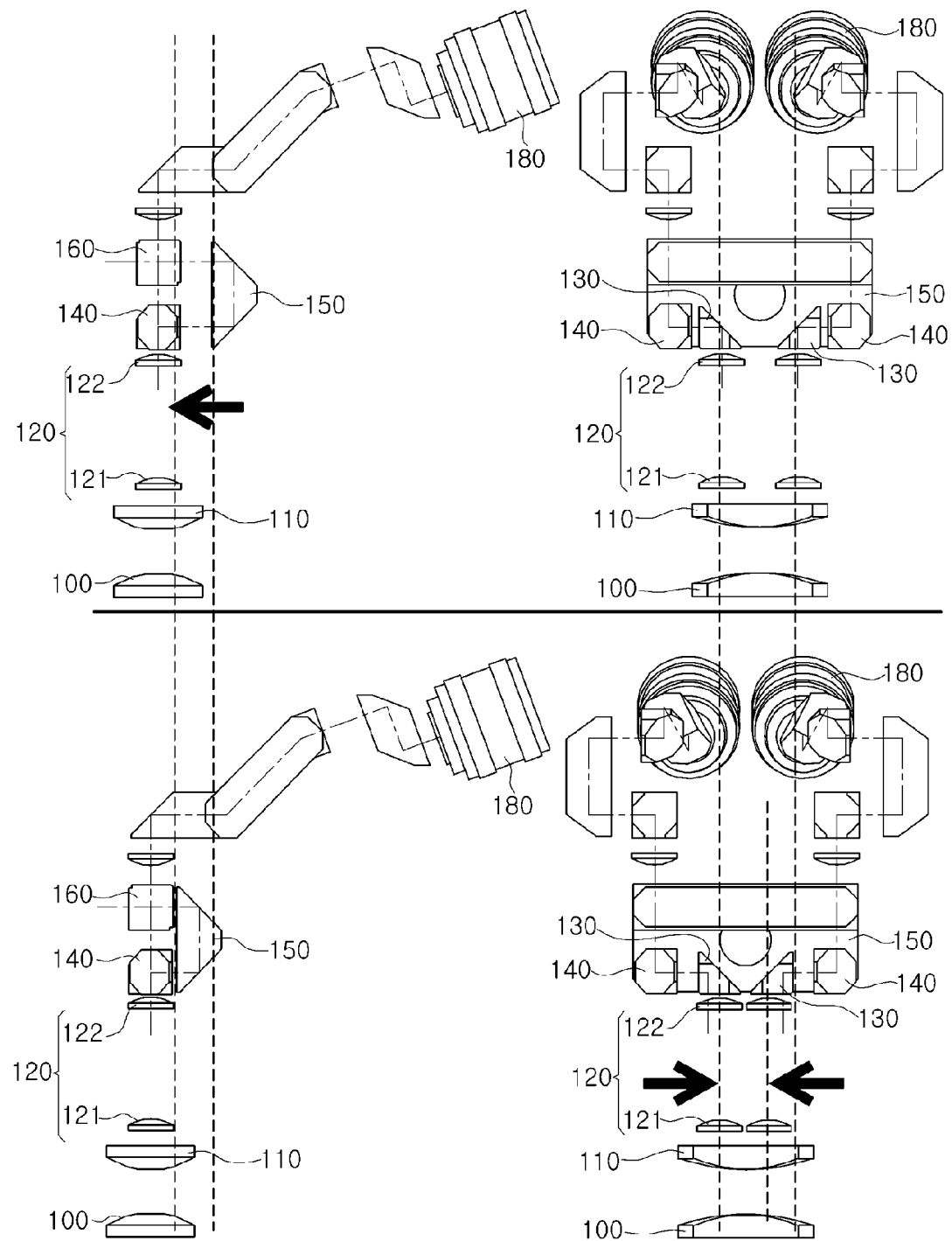
FIG. 2 is a view for explaining a process of adjusting three dimensional effect of an image of the stereo microscope according to an exemplary embodiment of the present invention.

FIG. 1 is a schematic view for illustrating a stereo microscope according to an exemplary embodiment of the present invention, and FIG. 2 is a view for explaining a process of adjusting three dimensional effect of an image of the stereo microscope according to an exemplary embodiment of the present invention.

Referring to FIG. 1 and FIG. 2, a stereo microscope according to an embodiment of the present invention includes an objective lens 100, a focusing lens 110, a pair of zoom units 120, a pair of first prisms 130, a pair of second prisms 140, and a third prism 150.

A main beam source or a pattern projector (not shown) emits a beam onto an object and the beam reflected by the object passes through the objective lens 100.

The focusing lens 110 is disposed over the objective lens 100, and the beam passing through the objective lens 100 passes through the focusing lens 100. The focusing lens 110 focuses the beam by adjusting the distance between the focusing lens 110 and the objective lens 100.

The pair of zoom units 120 is disposed over the focusing lens 110, and controls magnification. For example, the pair of zoom units 120 includes a plurality of zoom lenses 121 and 122. The zoom lenses 121 and 122 are arranged in parallel with a spacing distance such that the zoom lenses 121 and 122 can ascend or descend. The pair of zoom units 120 controls the magnification by adjusting the spacing distance between the zoom lenses 121 and 122. By adjusting the spacing distance between the pair of zoom units 120, the three dimensional effect of an image can be adjusted.

According to the stereo microscope according to an embodiment of the present invention, the spacing distance of the pair of zoom units 120 may be adjusted so that a user can adjust three dimensional effect of an image according to his personal tendency. Therefore, a convenience may be enhanced. Further, when an object such as a hole with various diameters and a depth is observed through a large stereo angle, the three dimensional effect is good, but interference between the hole and border is induced so that the inner part of the hole cannot be exactly observed. However, according to stereo microscope of the present invention, the spacing distance of the pair of zoom units 120 may be adjusted so that the objects such a hole with depth can be exactly observed.

The pair of first prisms 130 is disposed over the pair of zoom units 120, respectively. Each of the first prisms 130 receives the beam from the each of the zoom units 120 and changes direction of the beam in an outward direction of the zoom units 120 with ninety degrees. Each of the first prisms 130 may move in accordance with each of the zoom units 120.

The pair of the second prism 140 receives the beam from the pair of the first prisms 130 and changes the direction of the beam in a backward direction of the first prisms 130 with ninety degrees.

The third prism 150 receives the beam from the pair of the second prisms 140 and changes the direction of the beam in an upward direction of the pair of the second prisms 140 with ninety degrees, and then changes the direction of the beam again in a front direction of the third prism 150 with ninety degrees. The third prism 150 is configured to move in a backward direction of the second prism 140 such that a distance between the third prism 150 and the pair of the second prisms 140 can be adjusted. The third prism 150 compensates beam path length of the first prism 130 and the second prism 140, which is changed, by adjusting a spacing distance from the pair of second prisms 140 by the beam path length between the first prism 130 and the second prism 140, which is changed, since each of the first prisms 130 moves in accordance with each of the zoom units 120. Therefore, the beam path is maintained so that the optical system may be focused even through the spacing distance of the pair of the zoom units 120 is changed.

As described above, the beam of which focus is adjusted by compensating the beam path length through the third prism 150 passes through a fourth prism 160, a pair of lenses 170, a pair of fifth through eighth prisms 161, 162, 163 and 164 and to a pair of ocular lenses 180, so that a user can observe an object through the pair of ocular lenses 180.

As described above, the stereo microscope according to an embodiment of the present invention, the spacing distance of the pair of zoom units 120 may be adjusted so that a user can adjust three dimensional effect of an image according to his personal tendency. Therefore, a convenience may be enhanced. Further, when an object such as a hole with various diameters and a depth is observed through a large stereo angle, the three dimensional effect is good, but interference between the hole and border is induced so that the inner part of the hole cannot be exactly observed. However, according to stereo microscope of the present invention, the spacing distance of the pair of zoom units 120 may be adjusted so that the objects such a hole with depth can be exactly observed.

Additionally, the third prism 150 moves by amount of change beam path between the first prism 130 and the second prism 140 since each of the first prisms 130 moves in accordance with each of the zoom units 120 so that the spacing distance from the pair of the second prisms 140 is adjusted so that changed beam path between each of the first prism 130 and each of the second prism 140 is compensated to maintain the beam path. Therefore, even though the spacing distance between the pair of zoom units 120 is adjusted, the optical system can be exactly focused.

The specification of above is described with reference to preferred embodiments of the present invention. However, a skilled person in the related technical field or a person ordinary skilled in the art may understand that the present invention can be variously modified or changed within the limit of the idea and technical region be described in the claim.

What is claimed is:

1. A stereo microscope comprising:
  a pair of zoom units disposed on a focusing lens, the pair of zoom units having a left zoom unit and a right zoom unit, the pair of zoom units configured such that a spacing distance between the left zoom unit and the right zoom unit are adjusted to adjust a three dimensional effect;
  a pair of first prisms disposed on the zoom units, the pair of first prisms having a left first prism and a right first prism, which are on the left zoom unit and the right zoom unit, respectively, configured such that the left first prism and the right first prism move in accordance with the left zoom unit and the right zoom unit, respectively;
  a pair of second prisms receiving a beam from the pair of first prisms to change a direction of the beam, the pair of second prisms having a left second prism corresponding to the left first prism and a right second prism corresponding to the right first prism; and
  a third prism receiving the beam from the pair of second prisms to change a direction of the beam, a spacing distance between the third prism and each of the pair of second primes being adjusted by compensating amount of changed beam path length between the pair of first prisms and the pair of second prisms when the each of the left first prism and the right first prism moves in accordance with the left zoom unit and the right zoom unit so as to maintain the beam path constantly.

2. A stereo microscope comprising:
  an objective lens through which a beam passes, the beam being provided onto an object and reflected by the object;
  at least two zoom units disposed over an optical path of the objective lens to control magnification, the zoom units having a left zoom unit and a right zoom unit, a spacing distance between the left zoom unit and the right zoom unit being adjusted to adjust a three dimensional effect of an image;
  first prisms having a left first prism and a right first prism, disposed over the left zoom unit and the right zoom unit, respectively, and moving in accordance with spacing distance adjustment between the left zoom unit and the right zoom unit, the first prisms receiving reflected beams from the object from each of the zoom units and changing a direction of the reflected beams; and an adjusting part including at least one prism that is adjusted to maintain a beam path constantly by compensating beam path length that is changed in accordance with the changed spacing distance between the left zoom unit and the right zoom unit.

3. The stereo microscope of claim 2, wherein the adjusting part comprises:

a second prism receiving the beam, the direction of which is changed by the first prism; and a third prism receiving the beam, the direction of which is changed by the second prism, wherein the third prism is arranged so that a spacing distance between the second prism and the third prism is adjustable by changed amount of beam path length between the first prism and the second prism, which is changed in accordance with the movement of the beam path.

4. The stereo microscope of claim 3, further comprising an ocular lens disposed over the third prism and receiving the beam, the direction of which is changed by the third prism, wherein the ocular lens is integrally formed with the third prism.

5. The stereo microscope of claim 2, wherein each of the left zoom unit and the right zoom unit comprises:

a first zoom lens relatively near from the objective lens; and a second zoom lens relatively distant from the objective lens, wherein the spacing distance between first zoom lenses of the zoom units are adjusted, and the spacing distance between second zoom lenses of the zoom units are adjusted.

6. The stereo microscope of claim 5, wherein the first zoom lens and the second zoom lens are arranged with a vertical spacing distance such that the first zoom lens and the second zoom lens ascend or descend.

7. The stereo microscope of claim 2, further comprising a focusing lens through which the beam passing through the objective lens passes, a distance between the focusing lens and the objective lens being adjusted to focus the beam, wherein the zoom units are disposed on the focusing lens.

* * * * *